United States Patent
Beringer et al.

(10) Patent No.: US 7,765,166 B2
(45) Date of Patent: Jul. 27, 2010

(54) COMPILING USER PROFILE INFORMATION FROM MULTIPLE SOURCES

(75) Inventors: Joerg Beringer, Frankfurt (DE); Annette Lenz, Darmstadt (DE)

(73) Assignee: SAP AG, Walldorf (DE)

(*) Notice: Subject to any disclaimer, the term of this patent is extended or adjusted under 35 U.S.C. 154(b) by 1284 days.

(21) Appl. No.: 10/663,372

(22) Filed: Sep. 15, 2003

(65) Prior Publication Data

US 2004/0128156 A1 Jul. 1, 2004

Related U.S. Application Data

(60) Provisional application No. 60/436,219, filed on Dec. 23, 2002.

(51) Int. Cl.
*G06Q 10/00* (2006.01)
(52) U.S. Cl. ..................................... 705/319
(58) Field of Classification Search ...................... 705/1
See application file for complete search history.

(56) References Cited

U.S. PATENT DOCUMENTS

| | | | |
|---|---|---|---|
| 5,721,906 A | 2/1998 | Siefert | |
| 5,802,499 A | 9/1998 | Sampson et al. | |
| 6,003,011 A | 12/1999 | Sarin et al. | |
| 6,697,865 B1* | 2/2004 | Howard et al. | 709/229 |
| 6,820,082 B1 | 11/2004 | Cook et al. | |
| 6,959,268 B1 | 10/2005 | Myers, Jr. et al. | |
| 7,003,546 B1* | 2/2006 | Cheah | 709/200 |
| 7,222,369 B2 | 5/2007 | Vering et al. | |
| 7,283,951 B2 | 10/2007 | Marchisio et al. | |
| 7,340,679 B2 | 3/2008 | Botscheck et al. | |
| 7,392,254 B1 | 6/2008 | Jenkins | |
| 7,424,438 B2 | 9/2008 | Vianello | |
| 7,448,046 B2 | 11/2008 | Navani et al. | |
| 2001/0047276 A1* | 11/2001 | Eisenhart | 705/1 |
| 2001/0047293 A1* | 11/2001 | Waller et al. | 705/10 |
| 2002/0052894 A1 | 5/2002 | Bourdoncle et al. | |
| 2002/0059379 A1 | 5/2002 | Harvey et al. | |
| 2002/0073114 A1 | 6/2002 | Nicastro et al. | |
| 2002/0111787 A1 | 8/2002 | Knyphausen et al. | |
| 2002/0138331 A1* | 9/2002 | Hosea et al. | 705/10 |
| 2003/0023662 A1 | 1/2003 | Yaung | |
| 2003/0046401 A1 | 3/2003 | Abbott et al. | |
| 2003/0078830 A1 | 4/2003 | Wagner et al. | |
| 2003/0130994 A1 | 7/2003 | Singh et al. | |
| 2003/0144868 A1* | 7/2003 | MacIntyre et al. | 705/1 |
| 2003/0154180 A1* | 8/2003 | Case et al. | 707/1 |
| 2004/0122853 A1 | 6/2004 | Moore | |

(Continued)

OTHER PUBLICATIONS

U.S. Appl. No. 10/628,824, filed Jul. 28, 2003, entitled "Personal Procedure Agent".

(Continued)

*Primary Examiner*—John G Weiss
*Assistant Examiner*—Gabrielle McCormick
(74) *Attorney, Agent, or Firm*—Finnegan, Henderson, Farabow, Garrett & Dunner LLP

(57) ABSTRACT

Systems and techniques to compile profile information for a user of a computer network into a user object. In general, in one implementation, the technique includes: collecting profile information implicitly and explicitly from structured data sources; collecting profile information implicitly from unstructured data sources; and importing profile information inherited from collaborative entities with which the user is associated.

30 Claims, 8 Drawing Sheets

U.S. PATENT DOCUMENTS

2005/0086204 A1    4/2005    Coiera et al.

OTHER PUBLICATIONS

U.S. Appl. No. 10/655,783, filed Sep. 5, 2003, entitled "Community Builder".

U.S. Appl. No. 10/657,748, filed Sep. 8, 2003, entitled "Guided Procedure Framework".

U.S. Appl. No. 10/658,584, filed Sep. 8, 2003, entitled "Resource Finder Tool".

U.S. Appl. No. 10/663,343, filed Sep. 15, 2003, entitled "Collaborative Information Spaces".

U.S. Appl. No. 10/663,365, filed Sep. 15, 2003, entitled "Resource Templates".

U.S. Appl. No. 10/663,382, filed Sep. 15, 2003, entitled "Control Center Pages".

PCT International Search Report, mailed Mar. 10, 2005 (3 pages).

"OnlineHobbyist.com," Austin American Statesman, Austin, Texas, Sep. 11, 2000, p. E.1.

"SAP Customers Worldwide Exploit New Business Opportunities With Web-Based Real-Time Business Solutions," (Business Wire. New York, Dec. 8, 1998, p. 1).

3Com Palm VII Wireless Access Now Available for the project Gateway Enterprise Project Management System, Business Editors/High-Tech Writers, Business Wire, New York, Oct. 26, 1999 (proquest).

ProjectDash Drives Consistency in Communicating Project Status online Using Innovative Graphical Project Dashboard, Business Editors, Business Wire, New York, Mar. 4, 2002.

* cited by examiner

COMPILING USER PROFILE INFORMATION FROM MULTIPLE SOURCES

CROSS REFERENCE TO RELATED APPLICATIONS

This application claims the benefit of priority from U.S. Provisional Application entitled "User Productivity Suite," filed Dec. 23, 2002, application Ser. No. 60/436,219.

BACKGROUND

The following description relates to data processing of user information, for example, compiling user profile information from multiple sources.

Knowledge sharing is considered a relatively important tool for a user to achieve a high level productivity. Many users of conventional business systems may find it difficult to access information and/or tools required to perform a task. For example, the most relevant knowledge required by a user may be stored in documents, or in the head of another user or employee. Moreover, even if a user finds the information it is typically difficult to start an effective collaboration to perform a task or project. For example, administrative assistants may need to coordinate several activities to prepare for a customer visit, or a manager may need to access multiple information sources to complete a compensation plan for one or more user, etc. These types of activities may involve a relatively large number of tasks to complete, sometimes in a specific sequence and/or combination. Regardless of whether the tasks need to be completed regularly (e.g., daily, weekly) or just occasionally, a user of a database system may need to access several executable tools (e.g., executable applications) and retrieve information from various sources (e.g., data stored on a computer, or computer network). In a conventional work system, many tools and/or processes may have only one owner. Therefore, when multiple participants require that tool and/or process to complete a task, it is important that participants of a team are able to collaborate. Moreover, the tracking of completion of activities related to a collaborative project is important to ensure that all tasks related to the project are processed and completed in a timely fashion.

Enterprise portals have the challenge of providing employees with targeted information and services. Traditional role-based approaches which pull together a sub-set of functions and content that is considered to be appropriate for a typical user performing a particular role often fail because the granularity of personalization is on the normative role level and does not consider the context of one individual user.

SUMMARY

The present application describes systems and techniques relating to compile profile information for a user of a computer network into a user object.

In one aspect, a method is provided for populating a user profile with context information by transporting context information from other entity profiles to the user profile based on a relationship between the user profile and the entity profile, e.g., a collaborative or business relationship. Context information may also be "inherited", e.g., by importing context data from a parent entity profile into a depending child entity profile. The context information may be organized into context clusters, which may then be transported from the related entity profile(s) into the user profile. The context information in the user profile may then be used to personalize a work environment, e.g., a portal environment, by creating links to services and/or information spaces in the work environment. The context information in the user profile may be updated periodically. Context information may be removed based on relevance to the user, which may be determined from the user's activity. Inherited context information may be updated automatically when the corresponding context information in the parent entity is updated.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to data processing of user information.

User information can have substantial benefit for a corporation. Much of a corporation's value stems from the knowledge, training, skills, and experiences of its employees. However, accessing employee knowledge can be difficult.

In an embodiment, a process is provided for efficiently transporting context information (also referred to as "profile information" or "context metadata" from various sources to corporate users and using the context information for automatic personalization. The process relies on a controlled set of context clusters that may be associated with entities such as a project, a team, a workset definition, or a single user.

As soon as an individual user establishes a relationship with a business or collaborative entity the corresponding context cluster will be transported to the user's personal profile.

This process optimizes the efficiency of maintaining context clusters by associating them not with individual users but with re-usable entities such as team templates, worksets templates, and entities that relate to more than one user. When acting in a corporate work environment, the profile data of one user will be accumulated automatically. Different decay functions may handle the fade out of unused relationships. The personalization services support filtering of first level information maintained explicitly by the user, and second level information transported to the user due to his or her activity.

Figure 1:
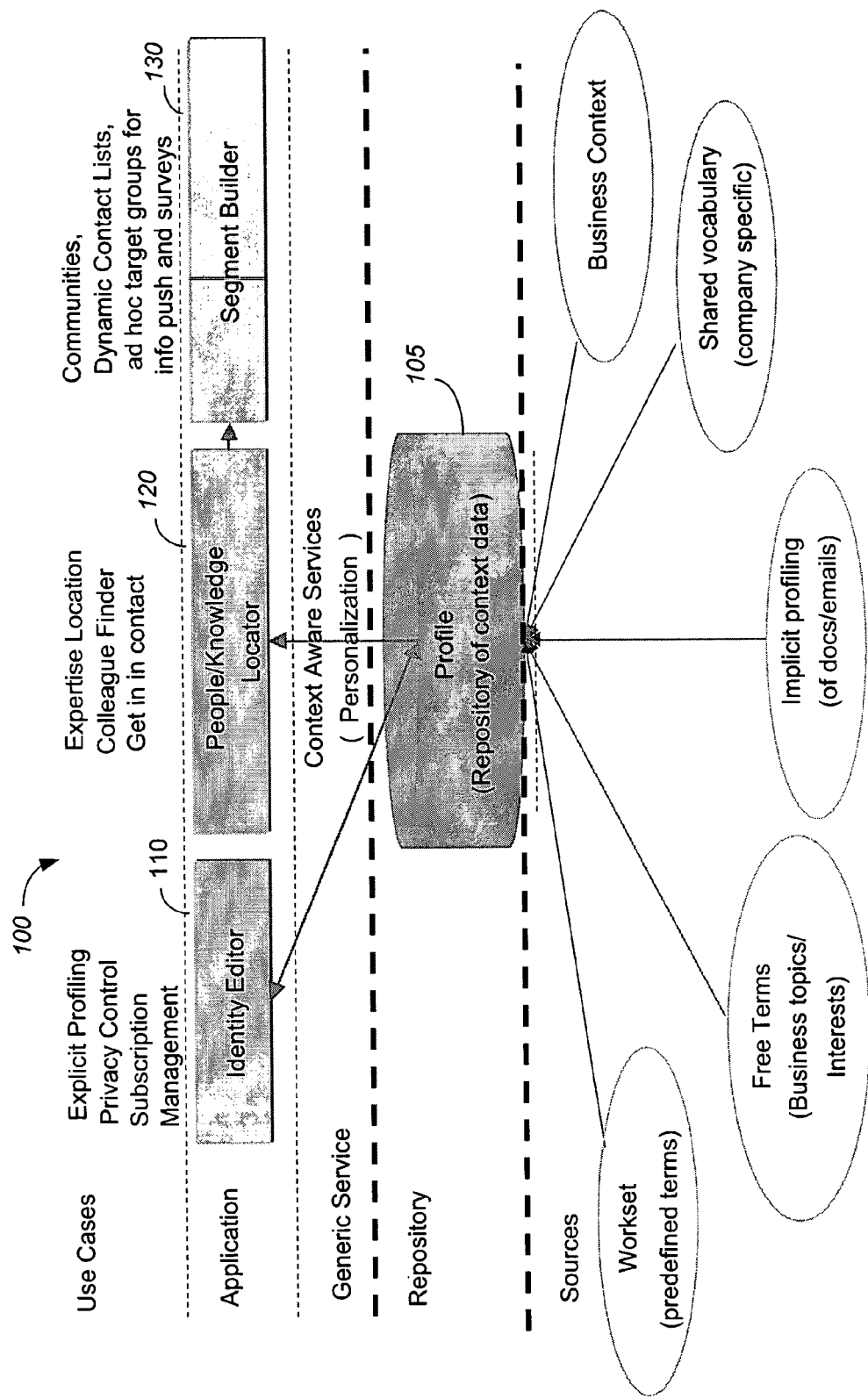
FIG. 1 shows block diagram of a system utilizing user objects including context metadata collected from multiple sources.

FIG. 1 shows a system 100 that compiles user profile information and uses that profile information for a number of applications. The system may use the profile information to personalize the user's computer work environment, to enable users to search and identify other users for various purposes, and/or to set up communities and messaging services among other uses.

Figure 2:
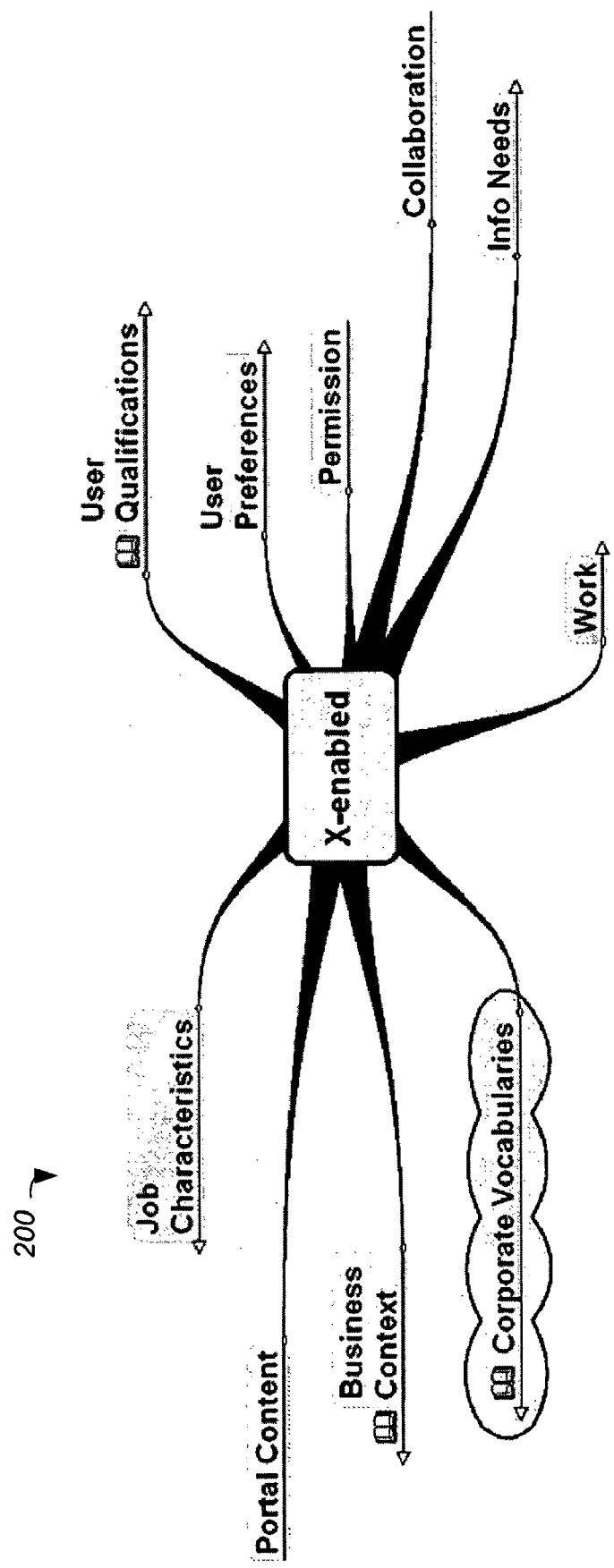
FIG. 2 is a representation of a context cluster for a user.

The profile information may be stored in a repository 105 of context information, e.g., a profile database. The profile information may include a number of different types of data from many different categories. FIG. 2 shows an exemplary context cluster 200 which may be used to organize profile information for a user, e.g., an employee of a corporation. The context cluster may organize the profile information in a number of pre-defined categories. The context cluster represents a user "object", with profile information constituting attributes of the user object.

Figure 3:
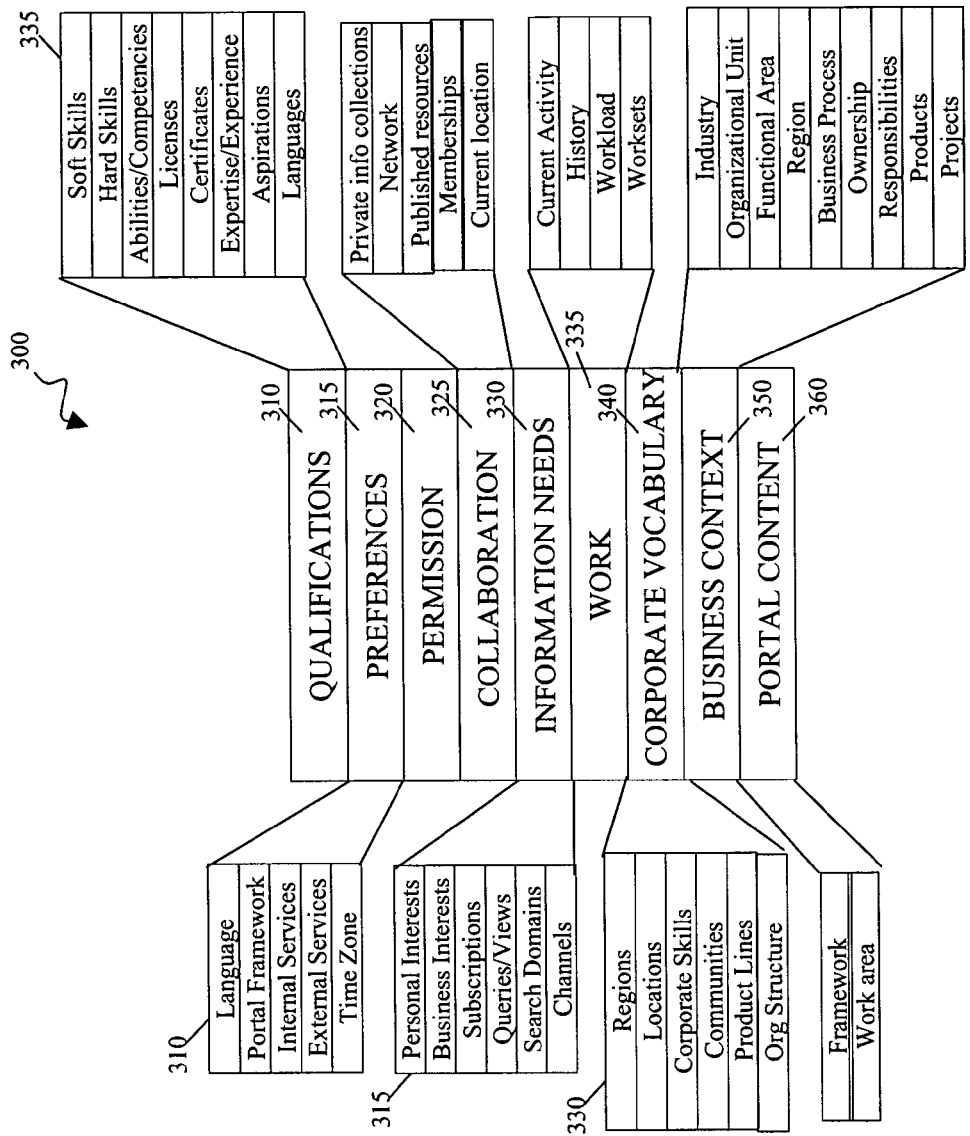
FIG. 3 is a block diagram of a user object with attributes in pre-defined categories of the context cluster of FIG. 2.

FIG. 3 shows examples of profile information that may be organized in the categories. In this example, the categories include the qualifications and skills of a participant 310, the personal preferences of the participant 315, the authorization level of the participant 320, the membership of the participant in formal and informal groups and other collaborative entities 325, the informational needs of the participant 330, the tasks and projects involving the participant 335, the vocabulary or taxonomies particular to the corporation 340, the context of the participant's participation in the corporation 350, and the portal content that the participant accesses 360. The categories are neither exhaustive nor mutually exclusive, e.g., certain descriptive information may fall within more than one category.

The portal content category 360 relates to employees working in an enterprise portal environment. A portal environment may be, for example, a website featuring a suite of commonly used services, serving as a starting point and frequent gateway to the Internet, an intranet or a niche topic (vertical portal). Portal services may include a search engine or directory, news, email, forums, chat, and options for personalization. In an implementation, a portal personalized for an employee may include links to, e.g., worksets of the employee, an inbox, a personal profile, ongoing work, services, and a finder tool, described below.

The profile information for a given user may be collected from different sources, e.g., different databases and systems, and by different mechanisms. The mechanisms for collecting profile information may be explicit or implicit. Explicit collection refers to collecting information from structured data sources or collecting information entered explicitly by the user personally or another person. For example, certain information, such as, e.g., the employee's name, location, department, and degrees and certificates, may be collected by parsing a database in the user's employer's human resources (HR) system. In an embodiment, the user may have access to an identity editor 110 made available in a portal page that allows the user to manually enter profile information and provides an overview of all context information available for that user. Implicit collection refers to automatic collection of information by the system from unstructured data sources, e.g., the user's email messages, published documents, and network data sources.

Figure 4:
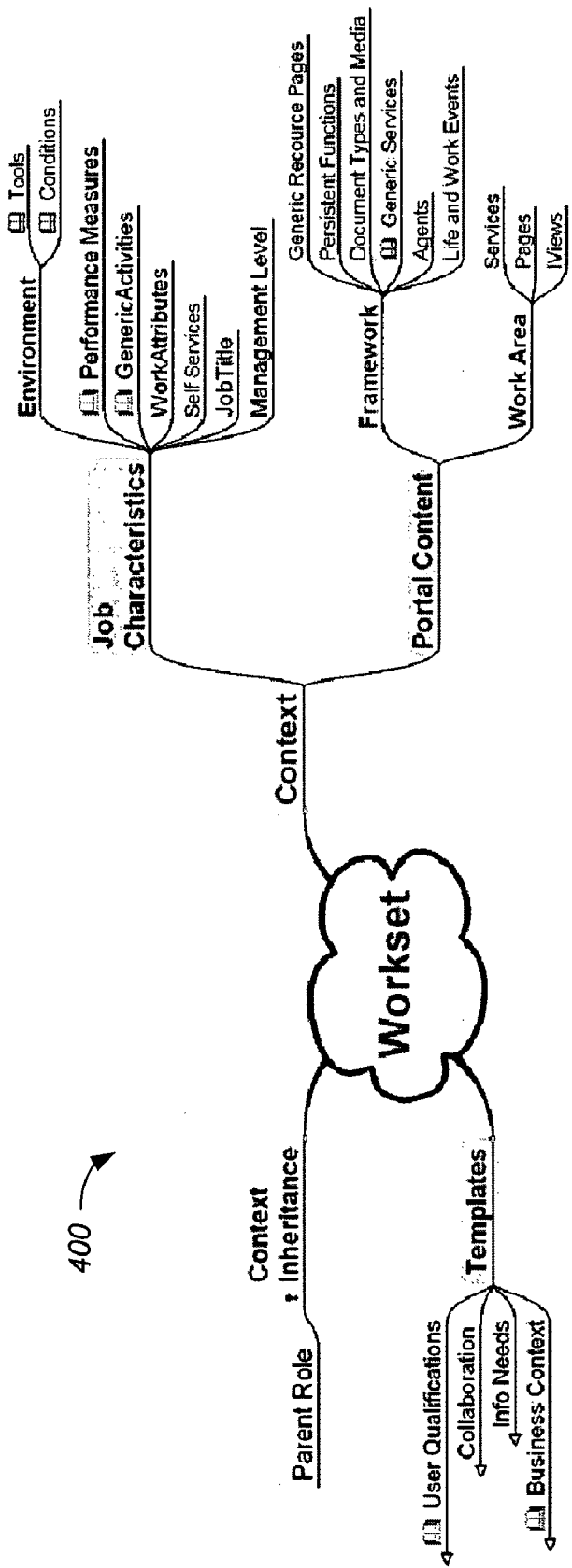
FIG. 4 is a representation of a context cluster for a workset.

Context clusters can be attached to collaborative entities such as teams and communities, as well as role definitions and worksets. Context metadata from context clusters of the collaborative entities may be inherited by the profiles of individual users associated with those context clusters. In this manner, profile information and context clusters relating to individual users can be maintained and transported to those user's personal profile (user object) with a minimum of administrative overhead. For example, FIG. 4 shows a context clusters for a workset 400. "Workset" refers to one or more data objects including content for achieving a particular work goal or small set of work goals. For example, when the work goal is a completed budget, the workset may include content such as a budget spreadsheet program, as well as the portal environment for presenting content to the user. The workset includes the tasks and corresponding portal environment for performing the particular work role, which may be bundled into one manageable data object. The workset thus reflects the user's work intent rather than stereotypical job titles, standard business objects, or business processes.

In some implementations, each workset defines a complete working environment for a given work role using a hybrid collection of elements including tools, information, communication and collaboration features, and user interface requirements. For example, consider the user profile represented by the context cluster shown in FIGS. 2 and 3. The profile information in the workset category "Portal Content" may be transported into the user profiles of employees assigned to this workset. Furthermore, information in a workset category not in the original user profile context cluster, e.g., "Job Characteristics", may be transported and added to the user profile context clusters for the employees assigned to the workset. A workset definition, such as that shown in FIG. 4, may also be derived from another master workset definition, which already includes certain context clusters. A workset has context clusters unique to worksets, e.g., job characteristics and portal content in FIG. 4. The portal content itself is divided into framework preferences and real content definition. In addition, the workset has a set of default context clusters that define additional aspects and will be transported to user's profile who are assigned to this workset.

Figure 5A:
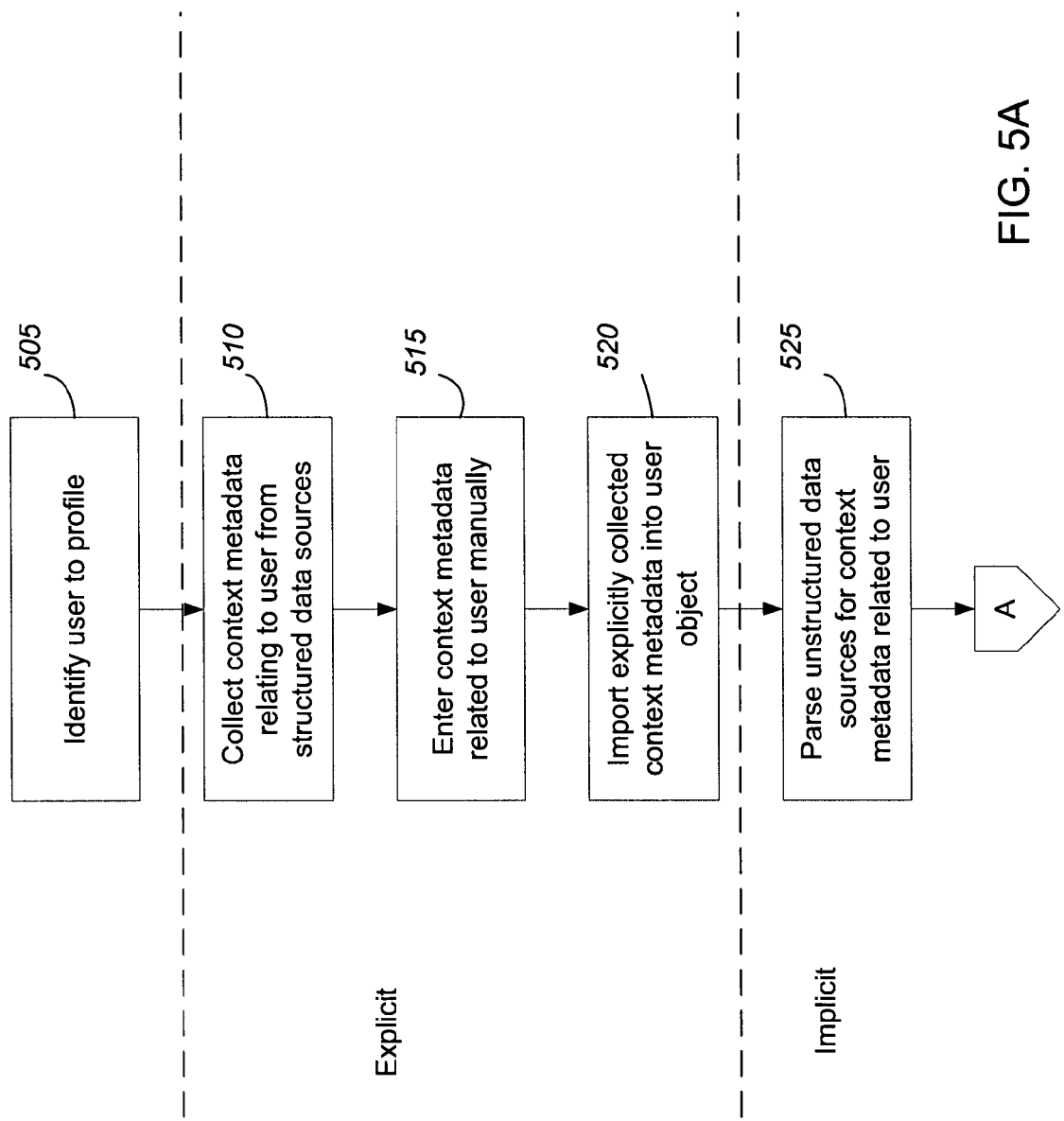
FIGS. 5A and 5B show a flowchart describing an operation for generating a user object including context metadata collected from multiple sources.
Figure 5B:
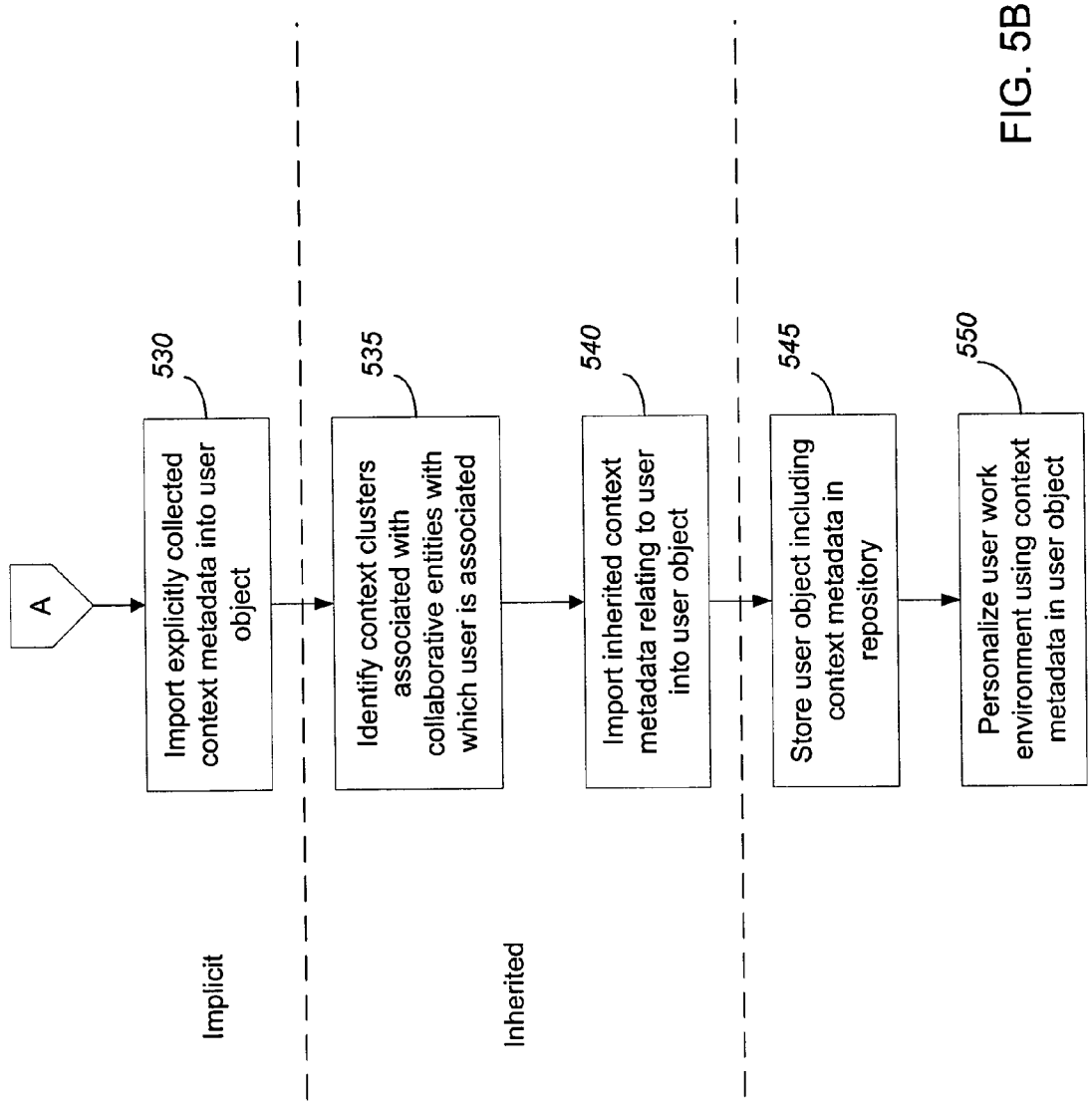

FIGS. 5A and 5B show a flowchart describing a technique for creating a user object from multiple sources. A user may be identified for profiling (block 505). A template user object with certain pre-defined categories may then be set up for the user. Profile information may be collected explicitly by searching structured data sources for information related to the user (block 510) and by entering context metadata manually (block 515). The explicitly collected data may be entered into the user object to populate the appropriate pre-defined categories (block 520).

Context metadata relating to the user may then be collected implicitly from unstructured data sources, e.g., the user's emails and documents (block 525). The implicitly collected context metadata may be transported into the user object to populate the appropriate categories and/or create new categories in the context cluster (block 530). Implicit profiling may also be based on business and collaborative relationships. Pre-existing context clusters from related business or collaborative entities, such as a project, a team, a workset definition, the corresponding context cluster may be transported into the user object.

Context metadata may be inherited from a parent entity to a more specific entity (e.g., to a workset from a master workset or to a specific user from a role definition) (block 535). The inherited user-related context metadata may be imported into the more specific entity to populate the appropriate categories and/or create new context clusters (block 540). This optimizes maintenance of the hierarchies of objects.

The user object with associated context metadata may be stored in the repository 105 (block 545). The information in the user object may then be used for various applications, e.g., personalization of the user's work environment in the enterprise portal (block 550).

Each user profile may be used to personalize that user's portal space and services. A personalization service API (Application Programming Interface) may enable other services use context information for personalization. The personalization service API may support functions like requesting information about a specific cluster, filtering between direct (explicit or implicit user specific information) and indirect (transported based on existing relationships like team membership and workset defaults). The personalization service API may also filter between explicit and implicit information. Requests can be across worksets or per workset. The syntax for requesting personalization profiles or subsets is driven by the structure of the context clusters.

The system may include a finder tool 120. The finder tool may be used to search the aggregated user profiles in the repository 105 for particular attributes, for example, to find users with particular experience or skills. The finder tool searches 204 the user objects for profiles that match the desired profile characteristics. The matches may not necessarily be exact matches. The finder tool may be implemented to retrieve the user profiles that are near matches. The matches and near matches may be provided as an initial hit list of matching profiles to the tool user.

The resource tool may then receive a list of refining attributes to narrow the initial list. The tool user may have specified a profile that matches a large number of individuals. For example, a person may have an experience attribute that identifies that person's areas of expertise. Other attributes that characterize a person resource may include licenses received, papers published, languages spoken, demographic information, title in an organization, activities and collaborations. The refining attributes may be used by the finder tool to select from the initial list a shorter, narrowed list that may then be provided to the tool user. The tool user may act directly on entries in the hit list, i.e., initiating a message by selecting an individual in the hit list.

The system may include a dynamic segmentation builder 130, which may use the aggregate user profiles in the repository to target individuals and create user segments. These user segments may include, for example, communities, communication channels, dynamically generated and updatable contact lists, and ad hoc target groups for information pushes and surveys. The user may select one primary dimension (e.g., interest, product, region, or tool) to define a first subset of users. The subject may be refined by adding constraints using other taxonomies. The user may preview the size of segment and exemplars of that segment. The user may save the results as static or dynamic people collections. Different refresh periods may be set for dynamic collections.

The identity inspector 110 is a tool that enables users to watch, edit, monitor their personal profiles. The identity inspector page may include an overview about all context metadata available for that user. The user may use the identity inspector to maintain explicit terms and business activities in the user's context cluster. The identity inspector may also provide filtered views by explicit, implicit, and inherited context metadata.

The user object may be updated on occasion. If new profile elements are found, the user will be notified. The user may then use the identity inspector to decide whether to update the profile as proposed, change it, or add other information. Also, an automatic decay function may be used to delete context metadata relating to unused relationships. There may be slower decay times for attributes that reach a certain level of relevance for a given user.

Figure 6:
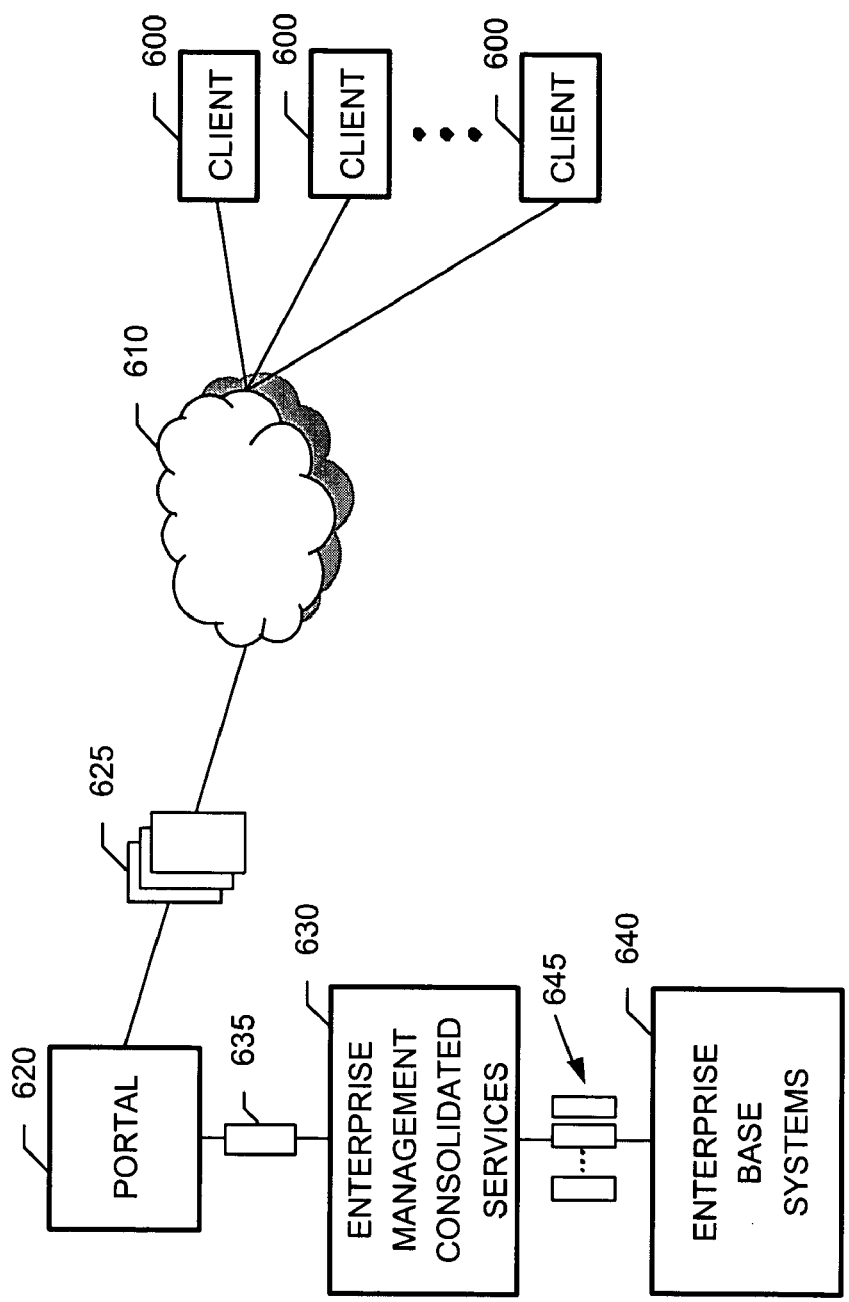
FIG. 6 is a block diagram illustrating an example of an integrated enterprise management system.

FIG. 6 is a block diagram illustrating an example integrated enterprise management system. Multiple clients 600 can access data over a network 610 through a portal 620. The network 610 can be any communication network linking machines capable of communicating using one or more networking protocols, e.g., a local area network (LAN), a wide area network (WAN), an enterprise network, a virtual private network (VPN), and/or the Internet. The clients 600 can be any machines or processes capable of communicating over the network 610. The clients 600 can be Web Browsers and optionally can be communicatively coupled with the network 610 through a proxy server (not shown).

A portal 620 provides a common interface to program management services. The portal 620 receives requests from the clients 600 and generates information views 625 (e.g., Web pages) in response. The portal 620 can implement a user roles-based system to personalize the common interface and the information views 625 for a user of a client 600. A user can have one or more associated roles that allow personalized tailoring of a presented interface through the generated information views 625.

The portal 620 communicates with an enterprise management system 630 that consolidates multiple application services. The portal 620 receives data 635 from the enterprise management system 630 for use in fulfilling the requests from the clients 600. The enterprise management system 630 can provide integrated application services to manage business objects and processes in a business enterprise. The business objects and processes can be resources (e.g., human resources), development projects, business programs, inventories, clients, accounts, business products, and/or business services.

The enterprise management system 630 communicates with enterprise base systems 640 to obtain multiple types of data 645. The enterprise base systems 640 can include various existing application services, such as human resource management systems, customer relationship management systems, financial management systems, project management systems, knowledge management systems, business warehouse systems, time management systems, and electronic file and/or mail systems. The enterprise base systems 640 also can include an integration tool, such as the eXchange Infrastructure provided by SAP, that provides another level of integration among base systems. The enterprise management system 630 can consolidate and integrate the data and functionality of such systems into a single enterprise management tool.

This enterprise management tool can include systems and techniques to facilitate creation of new applications within the enterprise management system 630. These new applications, referred to as cross-functional or composite applications, can readily draw on the resources of the enterprise base systems 640 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 630 using customized cross-functional applications. The stages can provide and consume determined services that can be integrated across multiple disparate platforms.

The portal 620, enterprise management system 630 and enterprise base systems 640 can reside in one or more programmable machines, which can communicate over a network or one or more communication busses. For example, the base systems 640 can reside in multiple servers connected to an enterprise network, and the portal 620 and the enterprise management system 630 can reside in a server connected to a public network. Thus, the system can include customized, web-based, cross-functional applications, and a user of the system can access and manage enterprise programs and resources using these customized web-based, cross-functional applications from anywhere that access to a public network is available.

Figure 7:
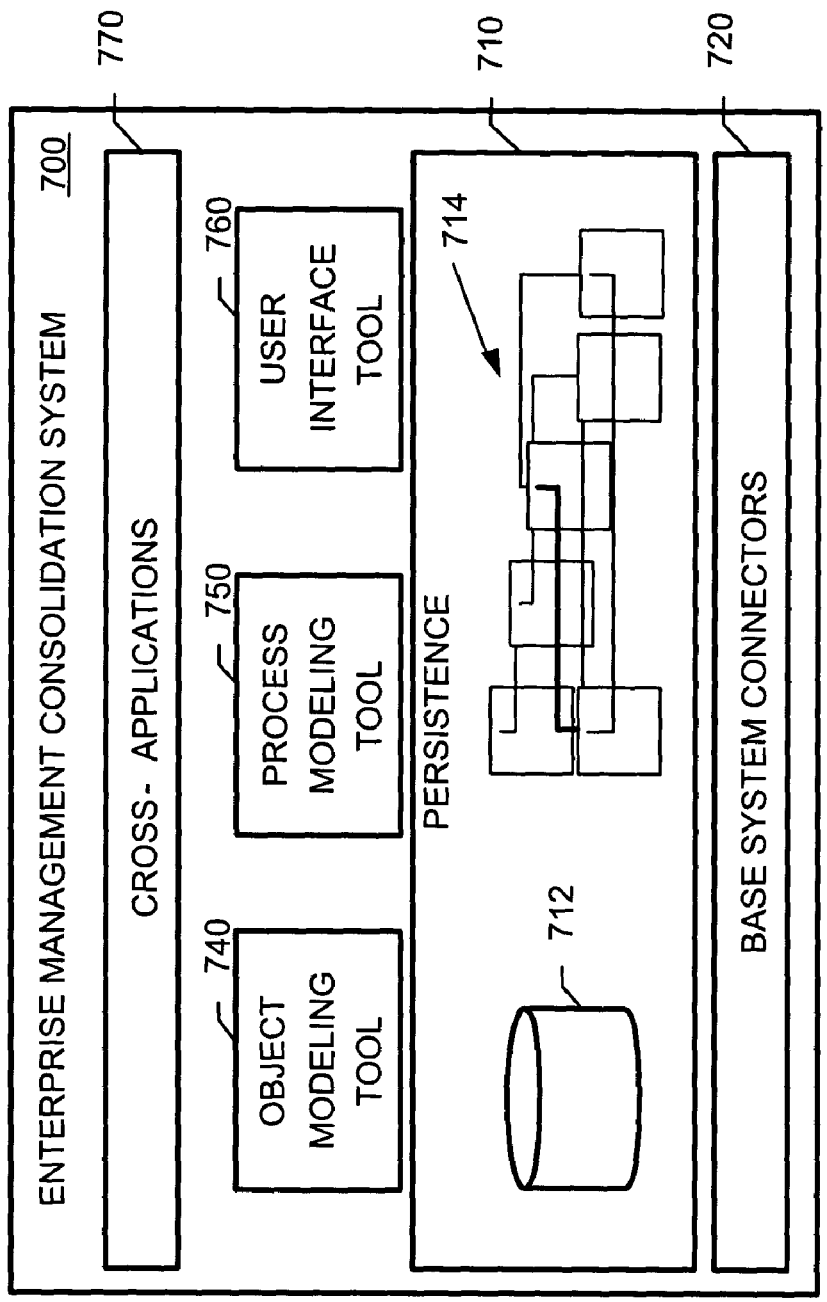
FIG. 7 is a block diagram illustrating components of an example enterprise management consolidation system.

FIG. 7 is a block diagram illustrating components of an example enterprise management consolidation system 700. The system 700 can include a persistence layer 710 and one or more base system connectors 720. The base system connectors 720 enable data exchange and integration with base systems. The base system connectors 720 can include a BC (Enterprise Connector) interface, an ICM/ICF (Internet Communication Manager/Internet Communication Framework) interface, an Encapsulated PostScripts®(EPS) interface, or other interfaces that provide Remote Function Call (RFC) capability.

The persistence layer 710 provides the enterprise management consolidation system 700 with its own database 712 and data object model 714. The database 712 and the object model 712 provide a consolidated knowledge base to support multiple enterprise management functions, including functions created as cross-applications 770. Active communication between the persistence layer 710 and the base systems can provide a tight linkage between real-time operational data from multiple base systems and an integrated enterprise analysis tool to allow strategic enterprise management and planning.

The data object model 714 can represent a subset of data objects managed by the base systems. Not all of the data aspects tracked in the base systems need to be recorded in the data object model 714. The data object model 714 may have defined relationships with data objects stored in the base systems, for example, certain objects in the data object model 714 may have read-only or read-write relationships with corresponding data objects in the base systems. These types of defined relationships can be enforced through the communication system built between the persistence layer 710 and the base systems. Thus, the persistence layer 710 can be used to effectively decouple application development from the underlying base systems.

The cross-functional applications 770, which take advantage of this decoupling from backend systems to drive business processes across different platforms, technologies, and organizations, can be created using a set of tools that enable efficient development of cross-functional applications 770. The cross-functional applications 770 can support semi-structured processes, aggregate and contextualize information, handle event-driven and knowledge-based scenarios, and support a high degree of collaboration in teams, including driving collaboration and transactions. The set of tools enable efficient development of the cross-functional applications 770 by providing application patterns that support model-driven composition of applications in a service-oriented architecture.

An object modeling tool 740 enables creation of new business objects in the persistency layer 710 by providing a mechanism to extend the data object model 714 dynamically according to the needs of an enterprise. A process modeling tool 750 enables creation of new business workflow and ad hoc collaborative workflow. A user interface (UI) tool 760 provides UI patterns that can be used to link new objects and workflow together and generate standardized views into results generated by the cross-functional applications 770. The object modeling tool 740, the process modeling tool 750 and the UI tool 760 thus can be used to build the components of cross-applications 770 to implement new enterprise management functions without requiring detailed coding activity.

The process modeling tool 750 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be made trackable by the process owner or by involved contributors using a dashboard that displays highly aggregated data. The dashboard and a myOngoingWork place can be two UI patterns that are provided by the UI tool 760.

The personalization concept could introduce more than one profile for one user. For example, there may be a set of "myProfiles" that the user can switch between in order to set different identities in the enterprise portal. This may be relevant to influence or personalize context awareness in an enterprise portal.

Whenever there is a strategic view on a cross-functional application scenario, analytics of the overall portfolio can be made available in the form of a collection of UI components. One type of analytics may be directed to context metadata. Data mining may be performed on all attributes and context clusters to obtain statistical data such as, for example, most frequent value, frequency of activation, frequency of co-existence at one user, frequency of explicit overwriting, and statistics of most frequent explicit entries. This data can be used to generate or update workset profiles or other normative profiles.

Cross-functional application scenarios can provide related information to the user when possible, and some parts within a larger cross-application scenario can define what kind of related information is to be offered. As described above, relatedness between entities may be used to enable automatic transports of context clusters. Heuristics can be used to identify such relatedness, such as follows: (1) information that is related to the user due to explicit collaborative relationships such as team/project membership or community membership; (2) information that is similar to a given business object in a semantic space based on text retrieval and extraction techniques; (3) recent objects/procedures of a user; (4) other people doing the same or similar activity (using same object or procedure template, having same workset); (5) instances of the same object class; (6) next abstract or next detailed class; (7) explicit relationships on the organizational or project structure; (8) proximity on the time scale; (9) information about the underlying business context; and/or (10) information about the people involved in a collaborative process.

Cross-functional applications also can include generic functionality in the form of ControlCenter Pages that represent generic personal resources for each user. These cross-applications can refer to the following pages where appropriate: (1) MyOngoingWork page: provides instant access to all dashboards that let users track their ongoing work. Ongoing work may refer to the state of business objects as well as guided procedures. (2) MyDay page: lists today's time based events that are assigned or related to the user. (3) MyMessageCenter page: Displays all pushed messages and work triggers using a universal inbox paradigm with user selected categorical filters. (4) MyInfo: Provides access to all personal info collections (documents, business objects, contacts) including those located in shared folders of teams and communities of which the user is a member. Also provides targeted search in collaborative information spaces such as team rooms, department home pages, project resource pages, community sites, and/or personal guru pages. The ControlCenter is part of the application (portal) framework which may be personalized by the workset definition portal content framework cluster.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments may be within the scope of the following claims.

What is claimed is:

1. A method being performed by a computer system, the method comprising:
    generating, by a processor of the computer system, a user profile corresponding to a user;
    identifying one or more entities related to the user, said one or more entities having corresponding entity profiles including context information comprising a plurality of types of categorized data;
    providing an initial list including entity profiles corresponding to one or more entities related to the user;
    refining the initial list based on a refining attribute to select an entity profile from the entity profiles included in the initial list;
    associating at least a portion of the context information from the selected entity profile to the user profile by importing at least the portion of the context information into the user profile, wherein the imported portion comprises data belonging to the plurality of types of categorized data;
    associating explicit context information with the user profile by collecting information entered by the user;
    associating implicit context information with the user profile by collecting information based on an email and a document of the user;
    associating inherited context information with the user profile by collecting information from a profile of a parent entity of the user profile;
    implementing, by using the processor, an identity inspector tool;
    sending, by the processor, a notification to the user to indicate that new information is available for updating the user profile, wherein the identity inspector tool provides:
        different filtered views of the user profile based on different types of context information, the filtered views including a first view having the explicit context information, a second view having the implicit context information, and a third view having the inherited context information;
        a first option to the user to accept the new information for updating the user profile based on the new information;
        a second option to the user to change the new information for updating the user profile based on the changed new information; and
        a third option to the user to add additional information to the new information for updating the user profile based on the additional information;
    assigning a collaborative task to the user;
    transporting, to the user profile, workset context information included in a workset associated with the collaborative task, wherein the workset defines a work environment including a communication feature, a collaboration feature, and a user interface requirement, and the collaborative task is performed by collaborating with another user in the work environment and by using the workset context information; and
    tracking progress of the task by implementing a dashboard indicating whether a milestone associated with the task is complete.

2. The method of claim 1, wherein at least a portion of said context information is organized into context clusters.

3. The method of claim 2, wherein said associating at least a portion of the context information from the selected entity profile to the user profile comprises transporting one or more context clusters into the user profile.

4. The method of claim 1, further comprising personalizing the work environment by including links in the work environment.

5. The method of claim 4, wherein the links are to services.

6. The method of claim 4, wherein the links are to information places.

7. The method of claim 1, wherein the work environment comprises a portal environment.

8. The method of claim 1, further comprising:
    updating the context information in the user profile periodically.

9. The method claim 1 further comprising:
    generating an additional user profile for the user; and associating at least an additional portion of the context information to the additional user profile by transporting at least the additional portion of the context information into the additional user profile.

10. The method of claim 9, further comprising:
switching between the user profile and the additional user profile based on a selection received from the user, wherein the user profile is associated with a first identity of the user in the work environment and the additional user profile is associated with a second identity of the user in the work environment, the second identity being different from the first identity.

11. The method of claim 1, wherein said identifying one or more entities related to the user comprises identifying one or more entities having a collaborative relationship with the user.

12. The method of claim 1, wherein said identifying one or more entities related to the user comprises identifying one or more entities having a business relationship with the user.

13. The method of claim 1, wherein the user is related to the one or more entities based on one of activities of the user, worksets of the user, and collaboration of the user with the one or more entities.

14. The method of claim 1 further comprising:
implementing a decay function for deleting a portion of the context information included in the user profile based on a decay time, wherein a duration of the decay time is set based on a relevance of the portion.

15. A method being performed by a computer system, the method comprising:
generating, by a processor of the computer system, a child entity profile corresponding to a child entity;
identifying parent entity profiles from which the child entity profile depends, the parent entity profiles including context information comprising a plurality of types of categorized data;
providing an initial list including the parent entity profiles;
refining the initial list based on a refining attribute to select a parent entity profile from the parent entity profiles included in the initial list;
importing at least a portion of the context information from the selected parent entity profile into the child entity profile, said imported context information comprising inherited context information belonging to the plurality of types of categorized data;
associating explicit context information with the child entity profile by collecting information entered by the child entity;
associating implicit context information with the child entity profile by collecting information based on an email and a document of the child entity;
updating the inherited context information in the child entity profile by editing data stored in the computer system in response to a change in the corresponding at least a portion of the context information in the parent entity profile;
implementing, by using the processor, an identity inspector tool;
sending a notification to the child entity to indicate that new context information is available for updating the child entity profile, wherein the identity inspector tool provides:
different filtered views of the child entity profile based on different types of context information, the filtered views including a first view having the explicit context information, a second view having the implicit context information, and a third view having the inherited context information;
a first option to the child entity to accept the new information for updating the child entity profile based on the new information;
a second option to the child entity to change the new information for updating the child entity profile based on the changed new information; and
a third option to the child entity to add additional information to the new information for updating the child entity profile based on the additional information;
assigning a collaborative task to the child entity;
transporting, to the child entity profile, workset context information included in a workset associated with the collaborative task, wherein the workset defines a work environment including a communication feature, a collaboration feature, and a user interface requirement, and the collaborative task is performed by collaborating with another parent entity or child entity in the work environment and by using the workset context information; and
tracking progress of the task by implementing a dashboard indicating whether a milestone associated with the task is complete.

16. The method of claim 15, further comprising personalizing the work environment associated with child entity.

17. The method of claim 16, wherein said personalizing comprises including links in the work environment.

18. The method of claim 17, wherein the links are to services.

19. The method of claim 17, wherein the links are to information places.

20. The method of claim 16, wherein the work environment comprises a portal environment.

21. The method of claim 15, wherein said inherited context information comprises context clusters.

22. The method of claim 15, further comprising:
updating the context information in the child entity profile periodically.

23. The method claim 15 further comprising:
generating an additional child entity profile for the child entity; and
associating at least an additional portion of the context information to the additional child entity profile by importing at least the additional portion of the context information into the additional child entity profile.

24. The method of claim 23, further comprising:
switching between the child entity profile and the additional child entity profile based on a selection received from the child entity, wherein the child entity profile is associated with a first identity of the child entity in a work environment and the additional child entity user profile is associated with a second identity of the child entity in the work environment, the second identity being different from the first identity.

25. The method of claim 15, wherein the child entity profile depends on the parent entity profile based on one of activities of the child entity, worksets of the child entity, and collaboration of the child entity with the parent entity profile.

26. The method of claim 15 further comprising:
implementing a decay function for deleting a portion of the context information included in the child entity profile based on a decay time, wherein a duration of the decay time is set based on a relevance of the portion.

27. A machine-readable storage medium including machine-readable instructions which, when executed on a processor, cause the processor to:
generate a user profile corresponding to a user;

identify one or more entities related to the user, said one or more entities having corresponding entity profiles including context information comprising a plurality of types of categorized data;

provide an initial list including entity profiles corresponding to one or more entities related to the user;

refine the initial list based on a refining attribute to select an entity profile from the entity profiles included in the initial list;

associate at least a portion of the context information from the selected entity profile to the user profile by importing at least the portion of the context information into the user profile, wherein the imported portion comprises data belonging to the plurality of types of categorized data;

associate explicit context information with the user profile by collecting information entered by the user;

associate implicit context information with the user profile by collecting information based on an email and a document of the user;

associate inherited context information with the user profile by collecting information from a profile of a parent entity of the user profile;

implement an identity inspector tool;

send a notification to the user to indicate that new information is available for updating the user profile, wherein the identity inspector tool provides:

different filtered views of the user profile based on different types of context information, the filtered views including a first view having the explicit context information, a second view having the implicit context information, and a third view having the inherited context information;

a first option to the user to accept the new information for updating the user profile based on the new information;

a second option to the user to change the new information for updating the user profile based on the changed new information; and a third option to the user to add additional information to the new information for updating the user profile based on the additional information;

assign a collaborative task to the user;

transport, to the user profile, workset context information included in a workset associated with the collaborative task, wherein the workset defines a work environment including a communication feature, a collaboration feature, and a user interface requirement, and the collaborative task is performed by collaborating with another user in the work environment and by using the workset context information; and track progress of the task by implementing a dashboard indicating whether a milestone associated with the task is complete.

28. The machine-readable storage medium of claim 27, wherein the user is related to the one or more entities based on one of activities of the user, worksets of the user, and collaboration of the user with the one or more entities.

29. A machine-readable storage medium including machine-readable instructions which, when executed on a processor, cause the processor to:

generate a child entity profile corresponding to a child entity;

identify parent entity profiles from which the child entity profile, the parent entity profiles including context information comprising a plurality of types of categorized data;

provide an initial list including the parent entity profiles;

refine the initial list based on a refining attribute to select a parent entity profile from the parent entity profiles included in the initial list;

import at least a portion of the context information from the selected parent entity profile into the child entity profile, said imported context information comprising inherited context information belonging to the plurality of types of categorized data;

update the inherited context information in the child entity profile in response to a change in the corresponding at least a portion of the context information in the parent entity profile;

associate explicit context information with the child entity profile by collecting information entered by the child entity;

associate implicit context information with the child entity profile by collecting information based on an email and a document of the child entity;

implement an identity inspector tool;

send a notification to the child entity to indicate that new information is available for updating the child entity profile, wherein the identity inspector tool provides:

different filtered views of the child entity profile based on different types of context information, the filtered views including a first view having the explicit context information, a second view having the implicit context information, and a third view having the inherited context information;

a first option to the child entity to accept the new information for updating the child entity profile based on the new information;

a second option to the child entity to change the new information for updating the child entity profile based on the changed new information; and a third option to the child entity to add additional information to the new information for updating the child entity profile based on the additional information;

assign a collaborative task to the child entity;

transport, to the child entity profile, workset context information included in a workset associated with the collaborative task, wherein the workset defines a work environment including a communication feature, a collaboration feature, and a user interface requirement, and the collaborative task is performed by collaborating with another parent entity or child entity in the work environment and by using the workset context information; and track progress of the task by implementing a dashboard indicating whether a milestone associated with the task is complete.

30. The machine-readable storage medium of claim 29, wherein the child entity profile depends on the parent entity profile based on one of activities of the child entity, worksets of the child entity, and collaboration of the child entity with the parent entity profile.

* * * * *